(12) United States Patent
Swartzlander, Jr. et al.

(10) Patent No.: US 8,166,091 B2
(45) Date of Patent: Apr. 24, 2012

(54) FLOATING-POINT FUSED DOT-PRODUCT UNIT

(75) Inventors: Earl Swartzlander, Jr., Austin, TX (US); Hani Saleh, Austin, TX (US)

(73) Assignee: Crossfield Technology LLC, Austin, TX (US)

(*) Notice: Subject to any disclaimer, the term of this patent is extended or adjusted under 35 U.S.C. 154(b) by 835 days.

(21) Appl. No.: 12/268,136

(22) Filed: Nov. 10, 2008

(65) Prior Publication Data

US 2010/0121898 A1    May 13, 2010

(51) Int. Cl.
G06F 7/485      (2006.01)
G06F 7/487      (2006.01)
(52) U.S. Cl. ...................................................... 708/501
(58) Field of Classification Search .................. None
See application file for complete search history.

(56) References Cited

U.S. PATENT DOCUMENTS

| | | | | |
|---|---|---|---|---|
| 7,461,117 B2* | 12/2008 | Trong et al. | .................... | 708/501 |
| 7,917,568 B2* | 3/2011 | Henry et al. | .................... | 708/523 |
| 8,078,660 B2* | 12/2011 | Quinnell et al. | .................... | 708/501 |
| 2002/0107900 A1* | 8/2002 | Enenkel et al. | .................... | 708/501 |
| 2003/0041082 A1* | 2/2003 | Dibrino | .................... | 708/501 |
| 2008/0114826 A1* | 5/2008 | Mejdrich et al. | .................... | 708/523 |
| 2008/0256161 A1* | 10/2008 | Quinnell et al. | .................... | 708/501 |
| 2008/0256162 A1* | 10/2008 | Henry et al. | .................... | 708/523 |
| 2009/0077152 A1* | 3/2009 | Powell et al. | .................... | 708/501 |
| 2009/0138678 A1* | 5/2009 | Schwarz et al. | .................... | 712/205 |
| 2009/0248779 A1* | 10/2009 | Brooks et al. | .................... | 708/523 |
| 2009/0287757 A1* | 11/2009 | Rarick | .................... | 708/523 |
| 2011/0040815 A1* | 2/2011 | Penton et al. | .................... | 708/501 |
| 2011/0055308 A1* | 3/2011 | Mantor et al. | .................... | 708/523 |
| 2011/0072066 A1* | 3/2011 | Lutz | .................... | 708/497 |
| 2011/0137970 A1* | 6/2011 | Dockser et al. | .................... | 708/501 |
| 2011/0161389 A1* | 6/2011 | Langhammer et al. | .................... | 708/209 |
| 2011/0231460 A1* | 9/2011 | Ahmed | .................... | 708/205 |

OTHER PUBLICATIONS

Chris N. Hinds, "An Enhanced Floating Point Coprocessor for Embedded Signal Processing and Graphics Application," *Conference Record of the Thirty-Third Asilomar Conference on Signals, Systems, and Computers*, pp. 147-151, 1999.
Ren-Cang Li, Sylvie Boldo and Marc Daumas, "Theorems on Efficient Argument Reductions," *Proceedings of the $16^{th}$ IEEE Symposium on Computer Arithmetic*, pp. 129-136, 2003.
Arch D. Robison, "N-Bit Unsigned Division Via N-Bit Multiply-Add," *Proceedings of the $17^{th}$ IEEE Symposium on Computer Arithmetic*, pp. 131-139, 2005. Erdem Hokenek, Robert K. Montoye and Peter W. Cook, "Second-Generation RISC Floating Point with Multiply-Add Fused," *IEEE Journal of Solid-State Circuits*, vol. 25, No. 5, pp. 1207-1213, Oct. 1990.
*IEEE Standard for Binary Floating-Point Arithmetic*, ANSI/IEEE Standard 754, 1985.

* cited by examiner

*Primary Examiner* — David H Malzahn
(74) *Attorney, Agent, or Firm* — Cesari & Reed, LLP; R. Michael Reed

(57) ABSTRACT

In an embodiment, a dot-product unit to perform single-precision floating-point product and addition operations is disclosed that includes a first multiplier tree unit adapted to multiply first and second significand operands to produce a first set of two partial products. The dot-product unit further includes a second multiplier tree unit adapted to multiply third and fourth significand operands to produce a second set of two partial products, a shared exponent compare unit adapted to compare exponents of the first, second, third and fourth operands to produce an alignment shift value, and an alignment unit adapted to shift the second set of two partial products based on the alignment shift value. The dot-product unit also includes an adder unit adapted to add or subtract the first set of two partial products and the second shifted set of two partial products to produce a dot-product value that is a single-precision floating-point value.

20 Claims, 11 Drawing Sheets

FLOATING-POINT FUSED DOT-PRODUCT UNIT

FIELD

The present disclosure is generally related to a floating-point fused dot-product unit to perform floating-point multiplication and addition operations.

BACKGROUND

Dot-product calculations are frequently used to calculate the sum of the products of two sets of operands for digital signal processing applications, such as multiplication of complex numbers which is used in, for example, Fast Fourier Transform (FFT) and discrete cosine transform (DCT) butterfly operations. A dot-product calculation involves multiplying two pairs of operands and summing the products to produce a single precision dot-product value. In multiplying complex data the difference of two products is also very useful. Conventional floating-point hardware can perform a dot-product using two floating-point multiplication operations and one floating-point addition or subtraction operation, which operations may be performed serially or in parallel. However, serial execution of the dot-product operation may limit throughput, which may be undesirable in implementations that require rapid calculations. In contrast, while parallel execution using two independent floating-point multipliers followed by a floating-point adder may be fast, the additional multiplier unit is expensive both in terms of silicon area and power consumption.

Embodiments disclosed herein can provide solutions to these and other problems, and offer other advantages over the prior art.

SUMMARY

In a particular embodiment, a dot-product unit includes a first multiplier tree unit adapted to multiply a first and a second significand operand to produce a first set of two partial products and includes a second multiplier tree unit adapted to multiply a third and a fourth significand operand to produce a second set of two partial products. The dot-product unit further includes a shared exponent compare unit adapted to compare exponents of the first, second, third and fourth operands to produce an alignment shift value and an alignment unit to shift one of the sets of two partial products based on the alignment shift value. The dot-product unit also includes an adder unit adapted to add or subtract the first and second sets of partial products to produce a dot-product value that is a single-precision floating-point value.

In another particular embodiment, a floating-point fused dot-product unit includes a first multiplier tree unit having a first pair of inputs to receive a first pair of floating-point significand numbers and to produce a first pair of partial products. The floating-point fused dot-product unit further includes a second multiplier tree unit having a second pair of inputs to receive a second pair of floating-point significand numbers and to produce a second pair of partial products. The floating-point fused dot-product unit also includes a shared exponent compare unit coupled to the first and second pairs of inputs and adapted to compare first, second, third, and fourth exponents of the first and second pairs of floating-point significand numbers to provide an alignment shift output based on the comparisons. Further, the floating-point fused dot-product unit includes an alignment unit responsive to the alignment shift output to shift the second pair of partial products and includes an adder unit adapted to add or subtract the first and second pairs of partial products to produce a dot-product value.

In still another particular embodiment, a method of producing a single-precision floating-point dot-product is disclosed that includes multiplying a significand of a first floating-point number and a significand of a second floating-point number at a first multiplier tree unit of a fused dot-product unit to produce a first pair of partial products. The method further includes concurrently multiplying a significand of a third floating-point number and a significand of a fourth floating-point number at a second multiplier tree unit of the fused dot-product unit to produce a second pair of partial products. Additionally, the method includes comparing exponents associated with the first, second, third, and fourth floating-point numbers at a shared exponent compare unit of the fused dot-product unit to produce an alignment shift output that is provided to the second multiplier tree unit to shift the second pair of partial products. Further, the method includes adding or subtracting the first and second pairs of partial products at an adder unit of the fused dot-product unit coupled to produce a dot-product value.

DETAILED DESCRIPTION OF ILLUSTRATIVE EMBODIMENTS

Figure 1:
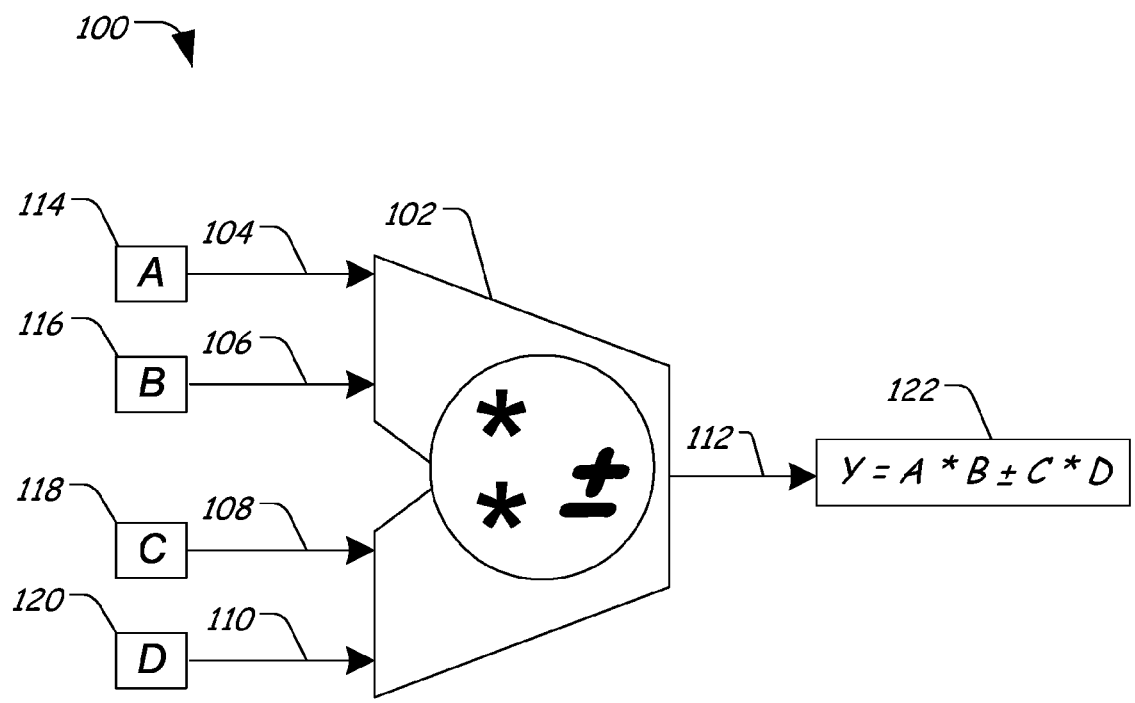
FIG. 1 is a block diagram of a particular illustrative embodiment of a fused dot-product unit.

FIG. 1 is a block diagram of a particular illustrative embodiment of a system 100 including a fused dot-product unit 102 to perform the following operation:

$$Y = A*B \pm C*D \quad \text{(Equation 1)}$$

where the variable (Y) is a dot-product value and the variables (A, B, C, and D) represent floating-point operands. The fused dot-product unit 102 includes first and second inputs 104 and 106 to receive a first floating-point number (A) 114 and a second floating-point number (B) 116, respectively. The fused dot-product unit 102 also includes third and fourth inputs 108 and 110 to receive a third floating-point number (C) 118 and a fourth floating-point number (D) 120, respectively. The fused dot-product unit 102 further includes an output 112 to provide a dot-product value (Y) 122.

In a particular embodiment, the fused dot-product unit 102 performs the numerical operation identified in Equation 1, which can be used to improve many digital signal processing (DSP) algorithms. In particular, the fused dot-product unit 102 can perform multiplication of complex operands faster and in fewer cycles than conventional systems. Such multiplication of complex operands is used in implementations of the Fast Fourier Transform (FFT) butterfly operation, the Discrete Cosine Transform (DCT) butterfly operation, vector multiplication operations, and wavelet transform operations, which operations can benefit greatly from enhanced processing speed offered by the fused dot-product unit 102.

Figure 2:
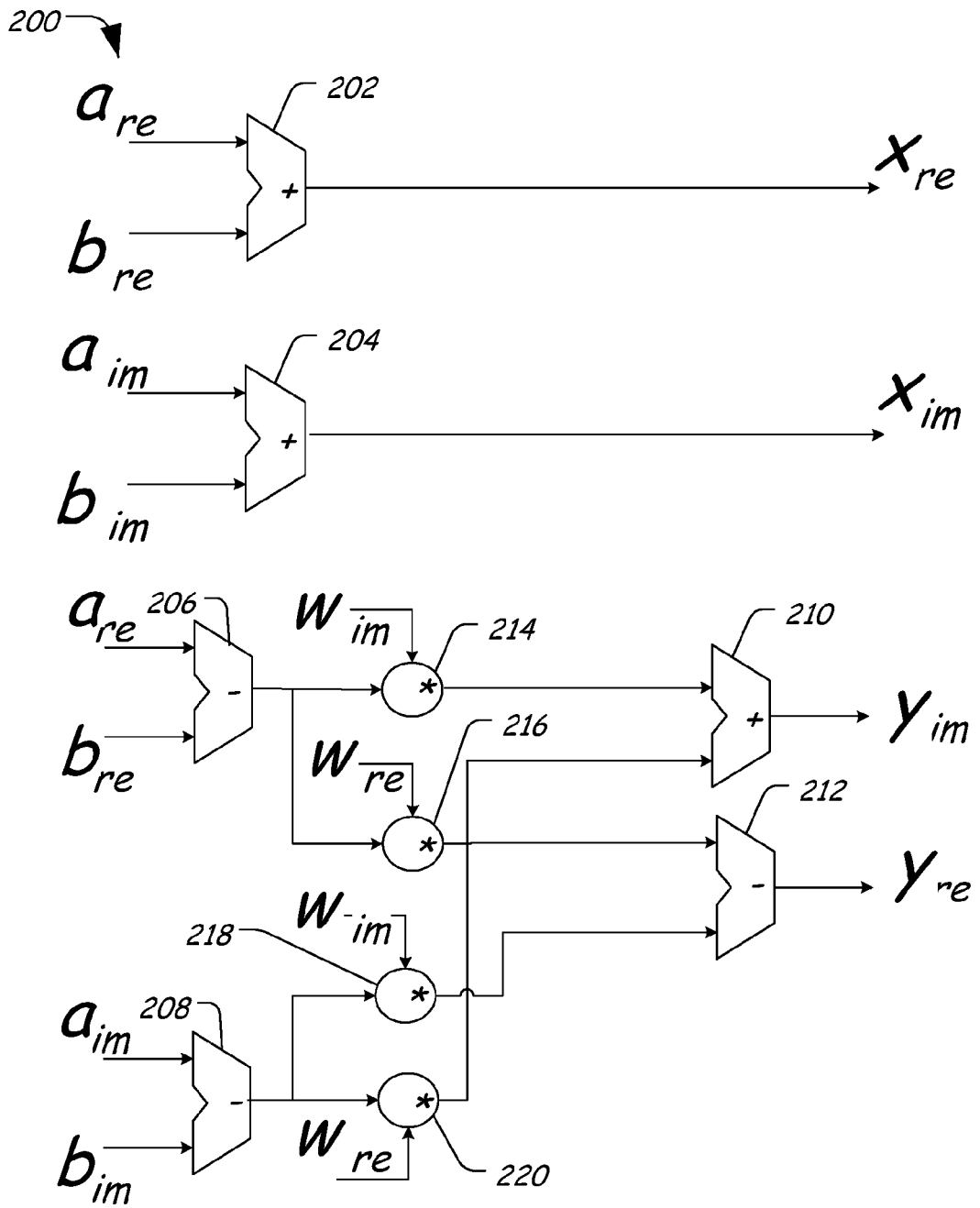
FIG. 2 is a block diagram of a particular illustrative embodiment of a Fast Fourier Transform (FFT) Radix-2 Butterfly computation, which can be performed using the fused dot-product unit of FIG. 1.

FIG. 2 is a block diagram of a particular illustrative embodiment of a Fast Fourier Transform (FFT) Radix-2 Butterfly computation 200, which can be performed using the fused dot-product unit of FIG. 1. The computation 200 includes six add operations 202, 204, 206, 208, 210, and 212, and four multiplication operations 214, 216, 218, and 220. In a particular example, two complex numbers (a and b) including real components ($a_{re}$ and $b_{re}$) and imaginary components ($a_{im}$ and $b_{im}$) are received. The real components ($a_{re}$ and $b_{re}$) are added in a first addition operation 202 to produce a first real sum ($x_{re}$). The imaginary components ($a_{im}$ and $b_{im}$) are added in a second addition operation 204 to produce a first imaginary sum ($x_{im}$). Additionally, the real components ($a_{re}$ and $b_{re}$) and the imaginary components ($a_{im}$ and $b_{im}$) are subtracted from one another via the operations 206 and 208 to produce difference values, and a dot-product operation is performed on the difference values using the multipliers 214, 216, 218 and 220 and the addition operations 210 and 212 to produce real and imaginary components ($y_{re}$ and $y_{im}$).

In a conventional parallel implementation with discrete floating-point adders and multipliers, ten operations are required (six addition operations 202, 204, 206, 208, 210, and 210 and four multiplication operations 214, 216, 218, and 220). However, by using the fused dot-product unit 102, illustrated in FIG. 1, two fused dot-product operations replace the multiplication operations 214, 216, 218, and 220 and the addition operations 210 and 212. The two fused dot-product operations and the four addition operations 202, 204, 206, and 208 can be used, for a total of six operations to perform the Fast Fourier Transform (FFT) Radix-2 Butterfly computation.

Figure 3:
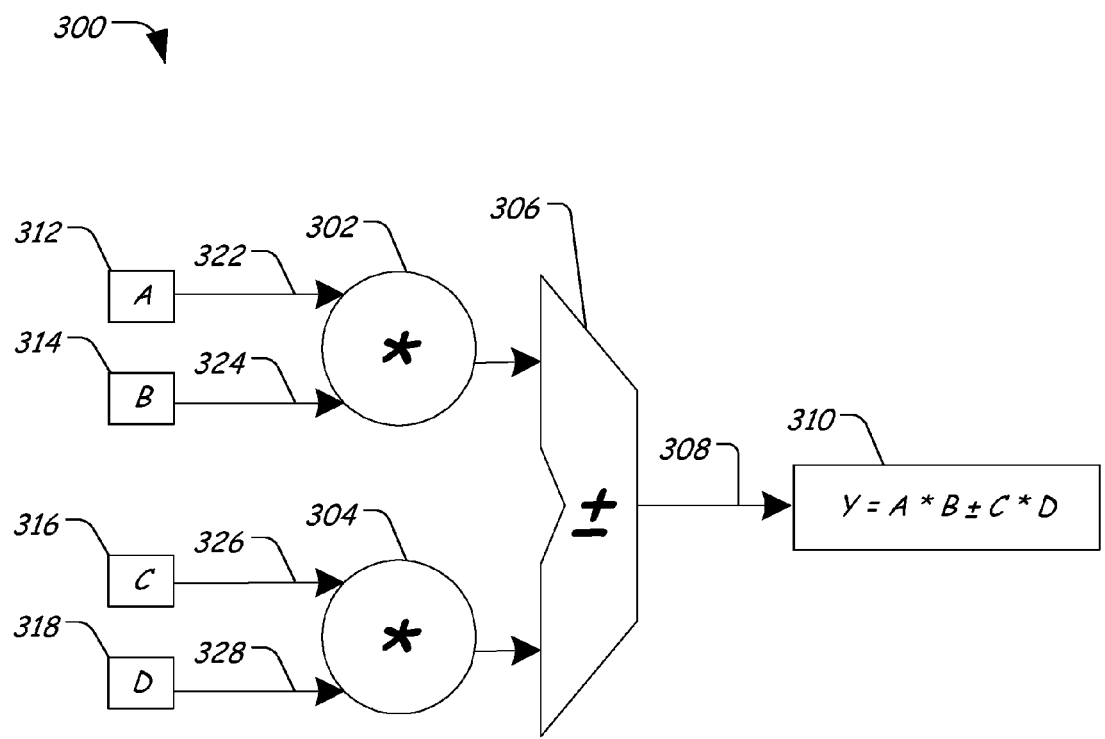
FIG. 3 is a block diagram of a particular illustrative embodiment of a parallel dot-product implementation including two parallel multipliers and an adder.

FIG. 3 is a block diagram of a particular illustrative embodiment of a parallel dot-product unit 300 including two parallel multipliers 302 and 304 and an adder 306. The first multiplier 302 includes a first input 322 and a second input 324 to receive a first operand (A) 312 and a second operand (B) 314. The second multiplier 304 includes a third input 326 and a fourth input 328 to receive a third operand (C) 316 and a fourth operand (B) 318. The first and second multipliers 302 and 304 provide first and second outputs, respectively, to the adder 306, which includes an output 308 to provide a dot-product value (Y) 310.

In a particular embodiment, the first and second multipliers 302 and 304 operate in parallel. This parallel approach can be appropriate for applications where maximizing the throughput outweighs minimizing the circuit area and/or power consumption. In contrast, the dot-product unit 102 illustrated in FIG. 1 replaces the first and second multipliers 302 and 304 and the adder 306 with a single unit. In a particular embodiment, the fused dot-product unit 102, which is illustrated in FIG. 1, occupies about thirty (30) percent less circuit area and operates approximately twenty-seven (27) percent faster than the parallel dot-product unit 300. Further, the numerical result (Y) of the fused dot-product unit 102 is more accurate because only one rounding operation is needed as compared to three (one for each of the first multiplier 302, the second multiplier 304, and the adder 306) in the parallel dot-product unit 300 illustrated in FIG. 3.

Figure 4:
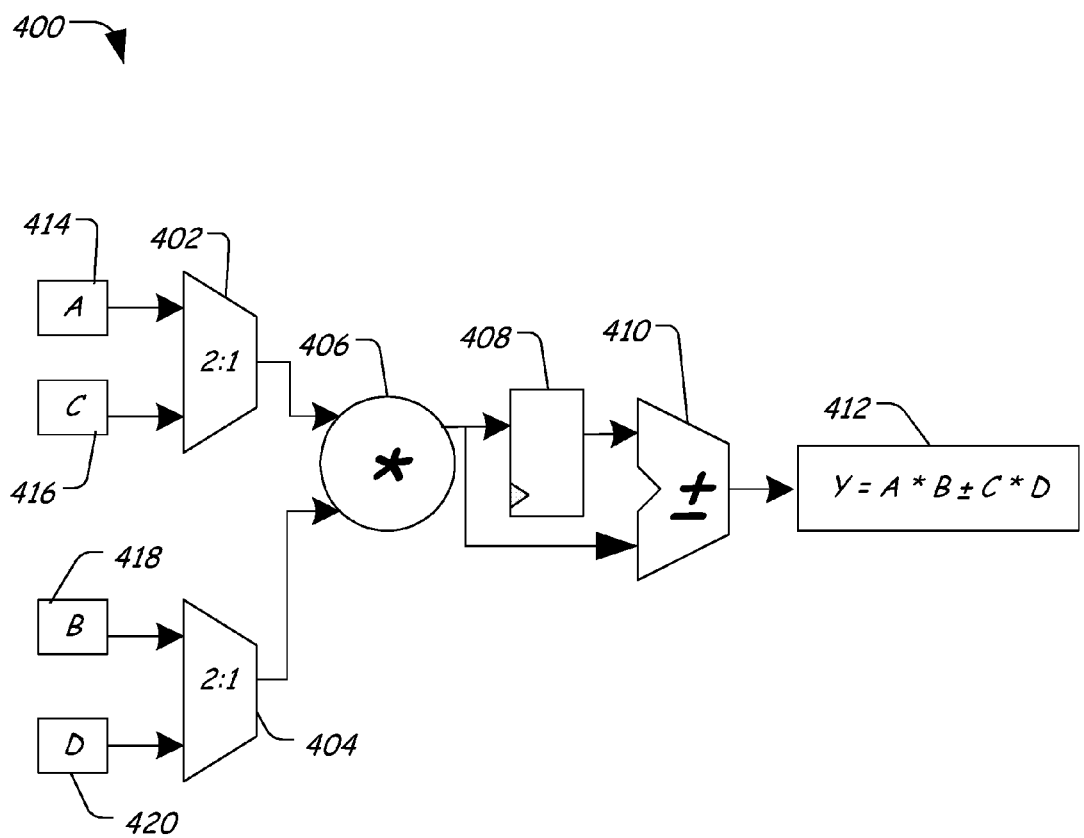
FIG. 4 is a block diagram of a particular illustrative embodiment of a serial dot-product implementation including two multiplexers, a single multiplier, a temporary storage register, and a single adder.

FIG. 4 is a block diagram of a particular illustrative embodiment of a serial dot-product unit 400 that includes a single multiplier 406 and a single adder 410. The serial dot-product unit 400 includes first and second two-to-one (2:1) multiplexers 402 and 404. The first two-to-one (2:1) multiplexer 402 includes two inputs to receive a first floating-point number (A) 414 and a third floating-point number (C) 416. The second two-to-one (2:1) multiplexer 404 includes two inputs to receive a second floating-point number (B) 418 and a fourth floating-point number (D) 420. The first and second two-to-one (2:1) multiplexers 402 and 404 provide respective outputs corresponding to the floating-point numbers (A, B, C, and D) 414, 418, 416, and 420, respectively, to inputs of the multiplier 406. The multiplier 406 produces a first product (A*B) that is latched into a temporary storage register 408 and produces a second product (C*D). The first product is provided from the temporary storage register 408 to the adder 410 and the second product is also provided to the adder 410, which generates an output (Y) 412, which is a dot-product of the floating-point numbers (A, B, C, and D) 414, 418, 416, and 420 (i.e., Y=A*B±C*D).

In a particular embodiment, the serial dot-product unit 400 has a slower throughput than either the parallel dot-product unit 300 (illustrated in FIG. 3) or the fused dot-product unit 102 (illustrated in FIG. 1). However, the serial dot-product unit 400 occupies approximately forty-two (42) percent less circuit area than the parallel dot-product unit 300 and approximately seventeen (17) percent less circuit area than the fused dot-product unit 102. While the serial dot-product unit 400 has slightly less circuit area and consumes less power, the fused dot-product unit 102 is approximately forty-eight (48) percent faster in performing a single-precision floating-point dot-product operation.

Figure 5:
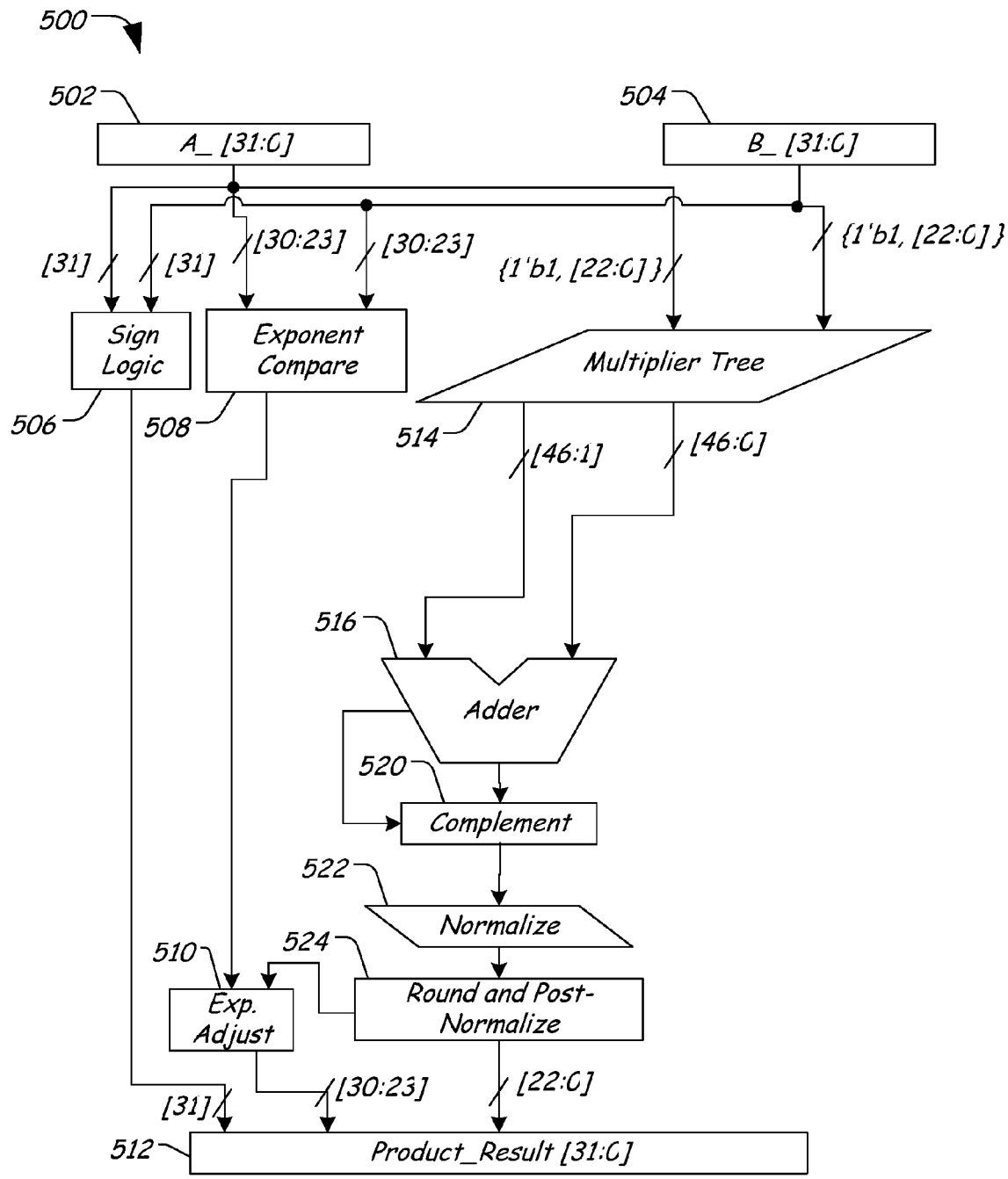
FIG. 5 is a block diagram of a particular illustrative embodiment of a floating-point multiplier.

FIG. 5 is a block diagram of a particular illustrative embodiment of a floating-point multiplier 500. The floating-point multiplier 500 includes a first input 502 to receive a first operand (A) and a second input 504 to receive a second operand (B). In a particular embodiment, the first and second operands (A and B) can be floating-point numbers. In another particular embodiment, the first and second operands (A and B) can be 32-bit floating-point numbers. In a particular embodiment, where the first and second operands (A and B) are 32-bit floating-point numbers, the floating-point multiplier 500 further includes a sign logic unit 506 coupled to the first and second inputs 502 and 504 to receive the $31^{st}$ bit of the first and second operands (A and B) and to determine the logical signs associated with the first and second operands (A and B). Additionally, the floating-point multiplier 500 includes an exponent compare unit 508 coupled to the first and second inputs 502 and 504 to receive bits [30:23] of the first and second operands (A and B) to compare exponents and to produce an exponent adjust signal to an exponent adjust circuit 510. The exponent adjust circuit 510 provides an adjustment output to a result block 512 based on the exponent adjust signal and on information received from a round and post-normalize unit 524.

Further, the sign logic 506 provides a logic sign to the result block 512. The floating-point multiplier 500 also includes a multiplier tree 514 coupled to the first and second inputs 502 and 504 to produce first and second partial products related to the first and second operands (A and B). The first and second partial products are provided to an adder 516. The adder 516 outputs a sum of the first and second partial products to a complement unit 520, which is controlled by the adder 516 to selectively complement the sum, for example based on an output of the sign logic 506. The normalize unit 522 receives data from the complement unit 520 and normalizes the received data. A round and post-normalize unit 524 performs a rounding operation and provides data to the exponent adjust unit 510. The round and post-normalize unit 524 provides the rounded data to the result block 512. The result block 512 includes a product from multiplying the first and second floating-point numbers.

In a parallel conventional implementation of the dot-product (such as that shown in FIG. 3), two floating-point multipliers are used in addition to a floating-point adder. Each of the multipliers and the adder performs a rounding operation in generating the result. Thus, by rounding both products prior to adding and by rounding the sum, rounding errors are introduced, reducing overall accuracy.

Figure 6:
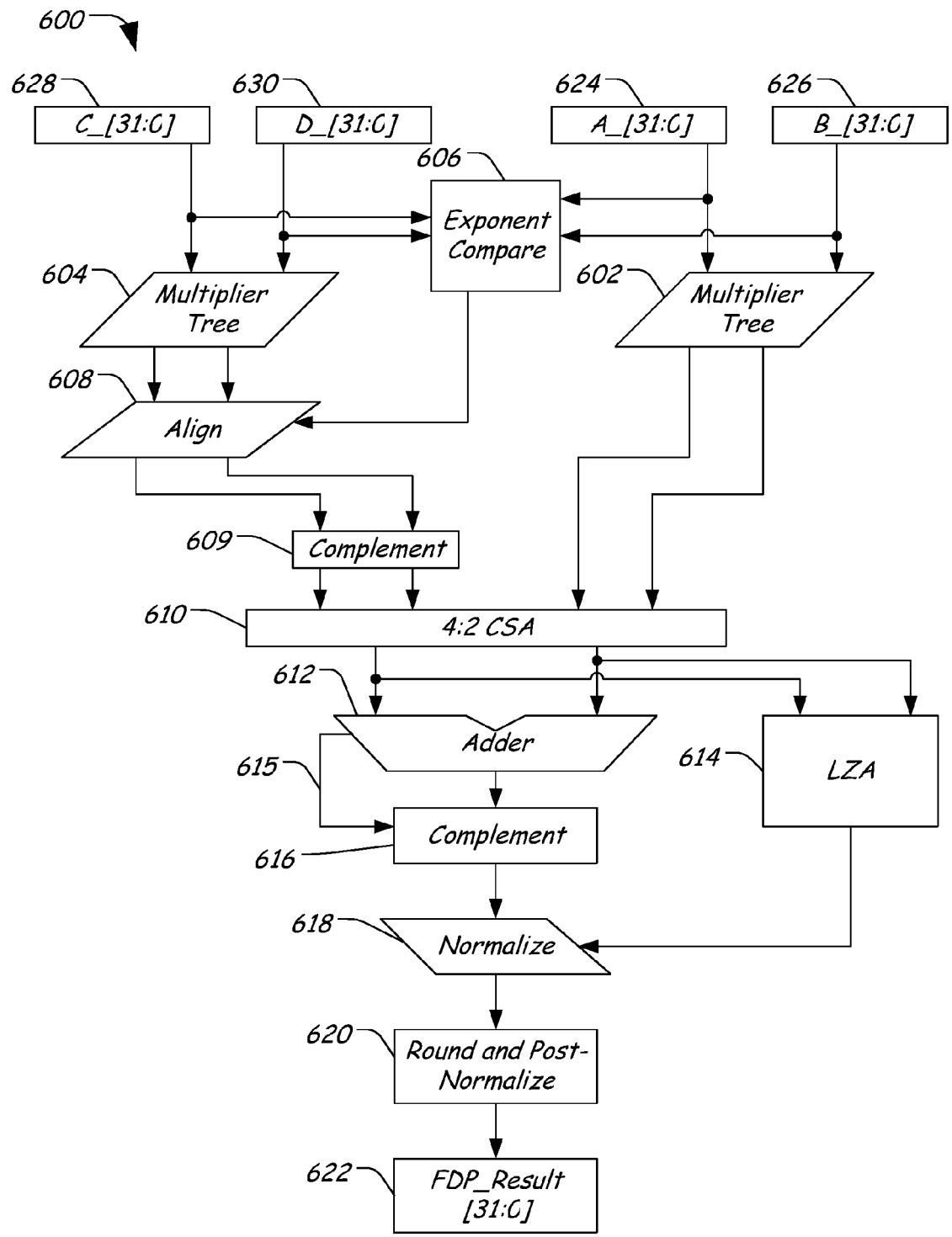
FIG. 6 is a block diagram of a particular illustrative embodiment of a floating-point fused dot-product unit including two multiplier trees, a shared exponent compare unit, an align component, a leading zeros anticipator, a normalizer and a rounding component.

FIG. 6 is a block diagram of a particular illustrative embodiment of a floating-point fused dot-product unit 600. In this instance, the floating-point fused dot-product unit 600 includes a first multiplier tree 602 and a second multiplier tree 604. The first multiplier tree 602 includes a first input 624 and a second input 626 to receive first and second operands (A and B). The second multiplier tree 604 includes a third input 628 and a fourth input 630 to receive third and fourth operands (C and D). In a particular embodiment, the first, second, third, and fourth floating-point numbers (A, B, C, and D) are 32-bit floating-point numbers.

The floating-point fused dot-product unit 600 further includes an exponent compare unit 606 that is coupled to the first, second, third, and fourth inputs 624, 626, 628, and 630 to compare exponents and to produce an exponent result and an exponent align signal to an align component 608, which is coupled to the second multiplier tree 604 to receive two partial products. The align component 608 is adapted to selectively shift the two partial products according to the exponent align signal and to provide the partial products, including the shifted partial products, to a complement block 609 that provides two outputs to a four-to-two (4:2) carry save adder (CSA) component 610. The first multiplier tree 602 is adapted to produce two partial products related to the first and second floating-point numbers (A and B) and to provide the partial products to the 4:2 CSA component 610. The complement block 609 can be used to selectively complement the partial products to produce a difference of A*B and C*D. In a particular example, the complement block 609 may be used to calculate the real part of a product of complex numbers (e.g., (a+jb)*(c+jd), where the real part of the product is ac−bd and the imaginary part of the product is ad+bc).

The 4:2 CSA component 610 receives the two pairs of partial products and generates two terms, which are provided to an adder 612 and to a leading zeros anticipator (LZA) 614. The adder 612 produces a sum of A*B and C*D and provides the sum to a complement module 616. Where the complement block 609 selectively complements at least two of the partial products, a difference value is provided to the complement module 616. The complement module 616 receives the sum from the adder 612 and an indicator 615 from the adder regarding whether or not to complement the sum. The complement module 616 selectively complements the sum, based on the indicator 615 from the adder 612, and provides an output to the normalize module 618. The LZA 614 determines a likely number of leading zeros in the final dot-product based on the values from the 4:2 CSA 610, and provides a signal to a normalize unit 618 indicative of predicted leading zero information.

The normalize module 618 applies a normalization operation to the output. The normalize module 618 provides the normalized output to a round and post-normalize module 620, which rounds the output to produce a dot-product result 622.

In a particular embodiment, the floating-point fused dot-product unit 600 performs a rounding operation only at 620, and does not round after each multiplication operation, as in the floating-point multiplier 500 illustrated in FIG. 5. Thus, rounding errors are reduced.

In a particular embodiment, if one pair of the operands (B and D or C and D) are set to a value of one, then the floating-point fused dot-product unit 600 can perform an addition-only operation. In a particular example, data forwarding multiplexers (not shown) can be included to forward the floating-point numbers (A and C or B and D) to bypass the first and second multiplication trees 602 and 604. In this particular example, the addition operation can be performed within a time that is approximately one multiplexer delay greater than a time to perform such addition via a discrete floating-point adder.

In another particular embodiment, the floating-point fused dot-product unit 600 can multiply two operands, such as the floating-point numbers (C and D or A and B) by setting at least one of the floating-point numbers (A, B, C, or D) to a value of zero and using data forwarding multiplexers (not shown) to bypass the alignment module 608. In this particular example, a two operand multiplication operation can be performed with a delay of two multiplexer operations greater than that of a discrete multiplier.

Figure 7:
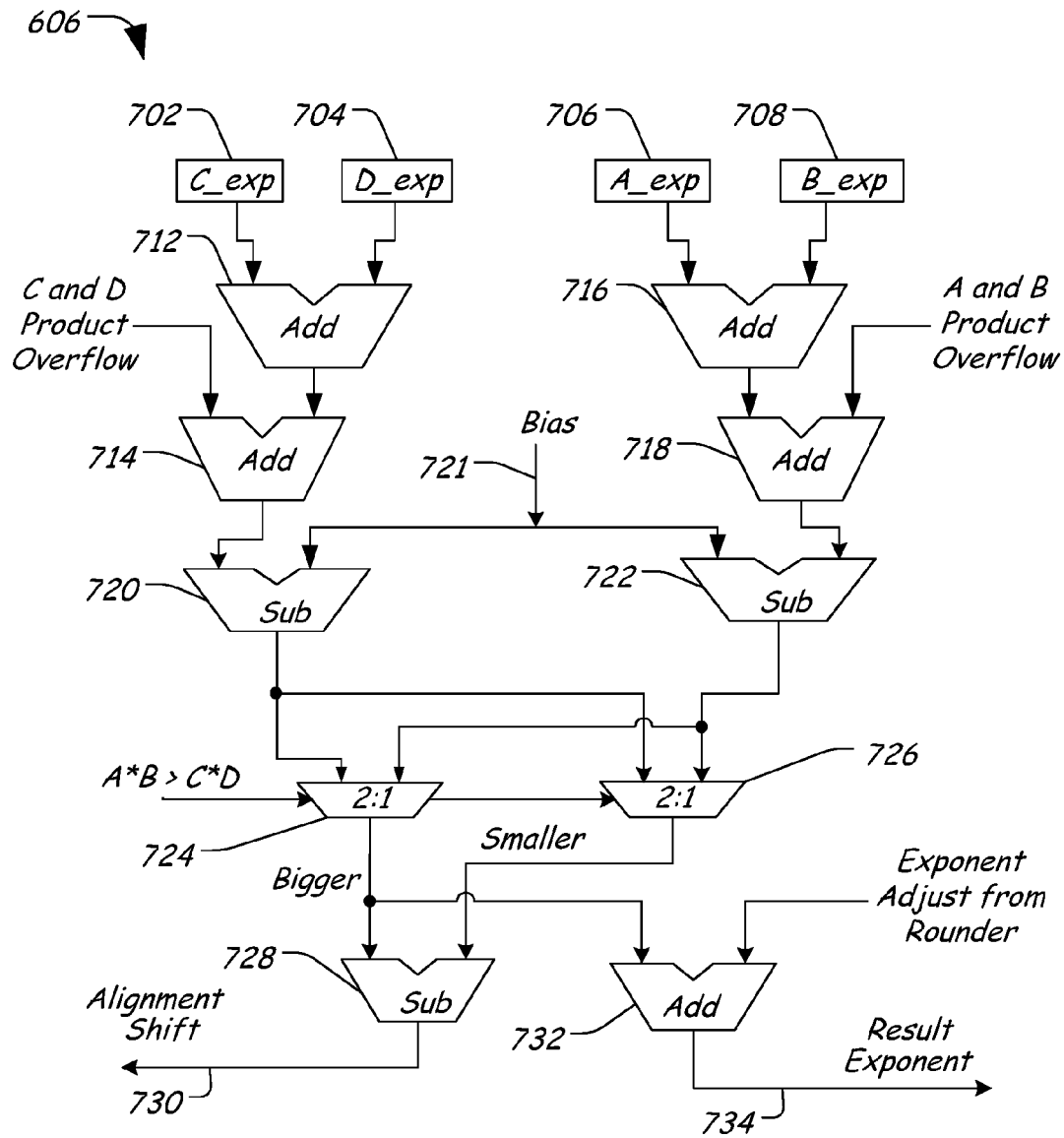
FIG. 7 is a block diagram of a particular illustrative embodiment of the exponent compare unit included in FIG. 6.

FIG. 7 is a block diagram of a particular illustrative embodiment of the exponent compare unit 606 illustrated in FIG. 6. The exponent compare unit 606 includes first and second inputs 706 and 708 to receive first and second exponents (A and B) corresponding to first and second operands (A and B) at the first and second inputs 624 and 626 illustrated in FIG. 6. The exponent compare unit 606 further includes third and fourth inputs 702 and 704 to receive third and fourth exponents (C and D) corresponding to third and fourth operands (C and D) at the third and fourth inputs 628 and 630 illustrated in FIG. 6.

The exponent compare unit 606 further includes a first adder 712 coupled to the third and fourth inputs 702 and 704 and adapted to provide a sum to a second adder 714, which includes a second input to receive product overflow data from multiplication of the third and fourth operands (C and D). The exponent compare unit 606 also includes a third adder 716 coupled to the first and second inputs 706 and 708 and adapted to provide a sum to a fourth adder 718, which includes a second input to receive product overflow data from multiplication of the first and second operands (A and B).

The second adder 714 provides a sum to a first subtract component 720, which subtracts a bias signal 721 from the sum to produce a first output that is provided to first and second multiplexers 724 and 726. The fourth adder 718 provides a sum to a second subtract component 722, which subtracts the bias signal 721 from the sum to produce a second output that is provided to the first and second multiplexers 724 and 726. The first multiplexer 724 provides a larger of the first and second outputs to a subtract module 728 and to an add module 732. The second multiplexer 726 provides a smaller of the first and second outputs to the subtract module 728. The subtract module 728 subtracts the larger number from the smaller number to produce an alignment shift signal 730, which is provided to an align module, such as the align module 608 illustrated in FIG. 6. The add module 732 receives the larger of the first and second outputs as a first input and an exponent adjust value from the rounding circuit as a second input and adds the smaller output and the exponent adjust value to produce an exponent result 734.

Figure 8:
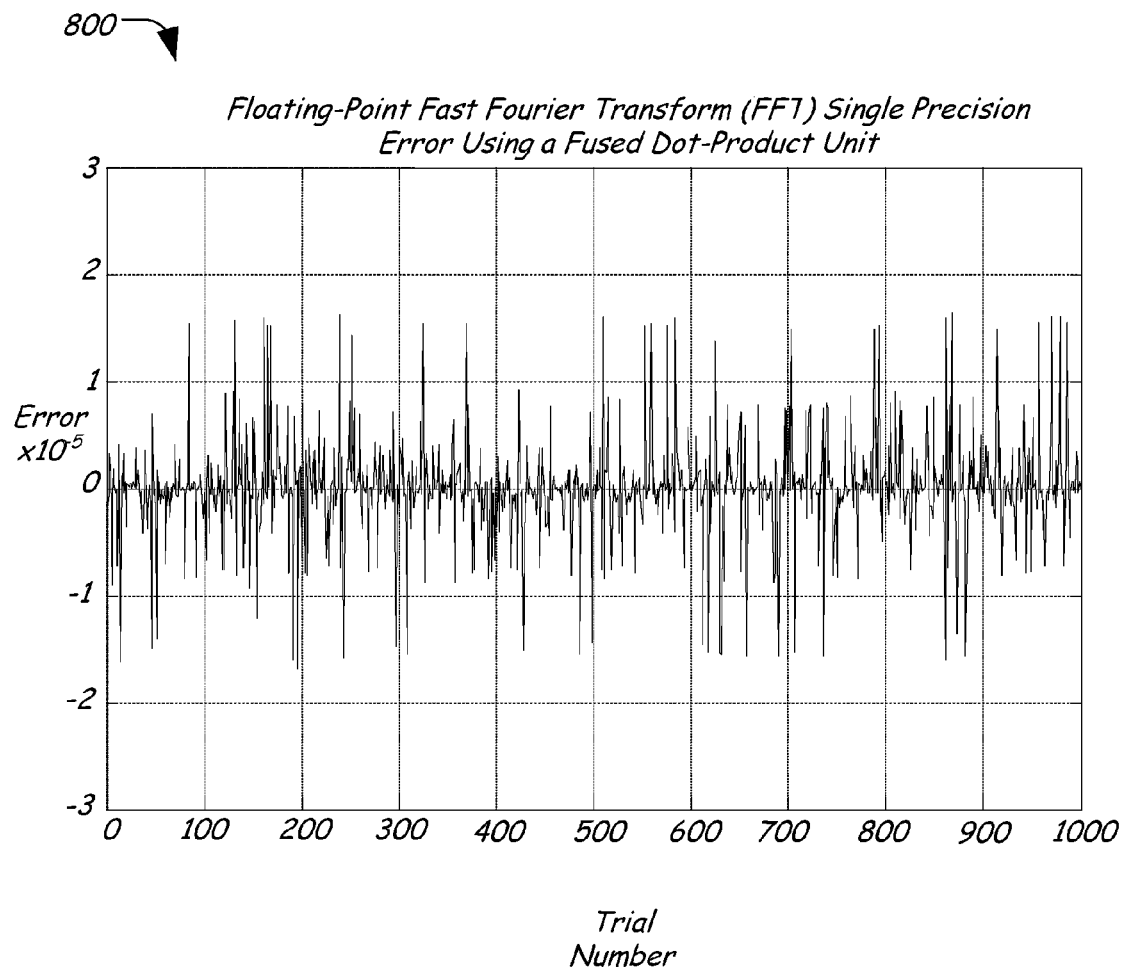
FIG. 8 is a graph of a particular illustrative embodiment of fused floating-point Fast Fourier Transform single-precision errors versus trial number for a fused floating-point dot-product unit.

FIG. 8 is a graph 800 of a particular illustrative embodiment of fused floating-point Fast Fourier Transform single-precision errors versus trial number for a fused floating-point dot-product unit. In a particular example, computing dotproducts using floating-point (FP) representations provides a wide dynamic range, which frees programmers from writing the manual scaling code required for fixed-point representations. However, floating-point computation suffers from two types of errors: propagation error, which is determined by the errors of input data and the operation type only, and rounding error, which is caused by the rounding of the operation result.

In a particular example, a value of the floating-point dot-product operation (f(x,y)) deviates from an expected value of the dot-product operation (f($\hat{x},\hat{y}$)) as follows:

$$f(x, y) \approx f(\hat{x}, \hat{y}) + \frac{\partial f(\hat{x}, \hat{y})}{\partial x}(x - \hat{x}) + \frac{\partial f(\hat{x}, \hat{y})}{\partial y}(y - \hat{y}) \quad \text{(Equation 2)}$$

The propagation error is derived as follows:

$$\varepsilon_{prop} = \frac{|f(x, y) - f(\hat{x}, \hat{y})|}{f(x, y)} \quad \text{(Equation 3)}$$

$$\approx \frac{f'(\hat{x}, \hat{y})\hat{x}}{f(\hat{x}, \hat{y})}\varepsilon_x + \frac{f'(\hat{x}, \hat{y})\hat{y}}{f(\hat{x}, \hat{y})}\varepsilon_y$$

$$= k_x \varepsilon_x + k_y \varepsilon_y$$

where the variable (k) is an amplification factor, which is determined based on the operation type and data. For floating-point multiplication, the propagation error amplification factors are defined by the following equations:

$$k_x = \frac{f'(\hat{x}, \hat{y})\hat{x}}{f(\hat{x}, \hat{y})} = \frac{\hat{x}\hat{y}}{\hat{x}\hat{y}} = 1.0 \quad \text{(Equation 4)}$$

$$k_y = \frac{f'(\hat{x}, \hat{y})\hat{y}}{f(\hat{x}, \hat{y})} = \frac{\hat{x}\hat{y}}{\hat{x}\hat{y}} = 1.0 \quad \text{(Equation 5)}$$

For floating-point addition, the amplification factors are defined by the following equations:

$$k_x = \frac{f'(\hat{x}, \hat{y})\hat{x}}{f(\hat{x}, \hat{y})} = \frac{\hat{y}}{\hat{x} + \hat{y}} \quad \text{(Equation 6)}$$

$$k_y = \frac{f'(\hat{x}, \hat{y})\hat{y}}{f(\hat{x}, \hat{y})} = \frac{\hat{x}}{\hat{x} + \hat{y}} \quad \text{(Equation 7)}$$

In a particular embodiment, the second component of an overall error of a floating-point operation is a rounding error. The rounding error can be derived based on a value of a floating-point significand according to the following equation:

$$z = (1.0 + a_1 2^{-1} + a_2 2^{-2} + \ldots + a_b 2^{-b} + a_{b+1} 2^{-b-1} + \ldots + a_{22} 2^{-22} + a_{23} 2^{-23}) \times 2^e \quad \text{(Equation 8)}$$

The floating-point representation is given by:

$$\hat{z} = (1.0 + a_1 2^{-1} + a_2 2^{-2} + \ldots + a_b 2^{-b}) \times 2^e \quad \text{(Equation 9)}$$

So the rounding error will be:

$$\varepsilon_{round} = \frac{z - \hat{z}}{z} \quad \text{(Equation 10)}$$

$$= \frac{(a_{b+1} 2^{-b-1} + \ldots + a_{22} 2^{-22} + a_{23} 2^{-23})}{(1.0 + a_1 2^{-1} + a_2 2^{-2} + \ldots + a_{23} 2^{-23})}$$

$$\approx \frac{p_{b+1} 2^{-b-1} + \ldots + p_{22} 2^{-22} + p_{23} 2^{-23}}{1.0 + p_1 2^{-1} + p_2 2^{-2} + \ldots + p_{23} 2^{-23}}$$

The arithmetic model for any floating-point add or multiply operation is the sum of these two errors given in Equations (3) and (10).

In the fused dot-product unit 102 (illustrated in FIG. 1) and the fused dot-product unit 600 (illustrated in FIG. 6), the overall error is given by the following equation:

$$\epsilon_{prop} = 3 \times \epsilon_{prop} + \epsilon_{round} \quad \text{(Equation 11)}$$

If the same operation is performed using discrete floating-point adders and multipliers, then the overall error will be given by:

$$\epsilon_{prop} = 3 \times \epsilon_{prop} + 3 \times \epsilon_{round} \quad \text{(Equation 12)}$$

The above analysis shows that the fused dot-product unit 102 or 600 has one-third of the rounding error of the discrete execution.

Referring again to FIG. 8, the graph 800 illustrates a Fast Fourier Transform (FFT) butterfly operation using the single-precision fused dot-product unit 600 illustrated in FIG. 6. In this particular example, the graph 800 shows error plots of the fused dot-product unit 600 in a range of $-1.7 \times 10^{-5}$ to $1.6 \times 10^{-5}$, as compared to a built-in MATLAB-type simulation.

Figure 9:
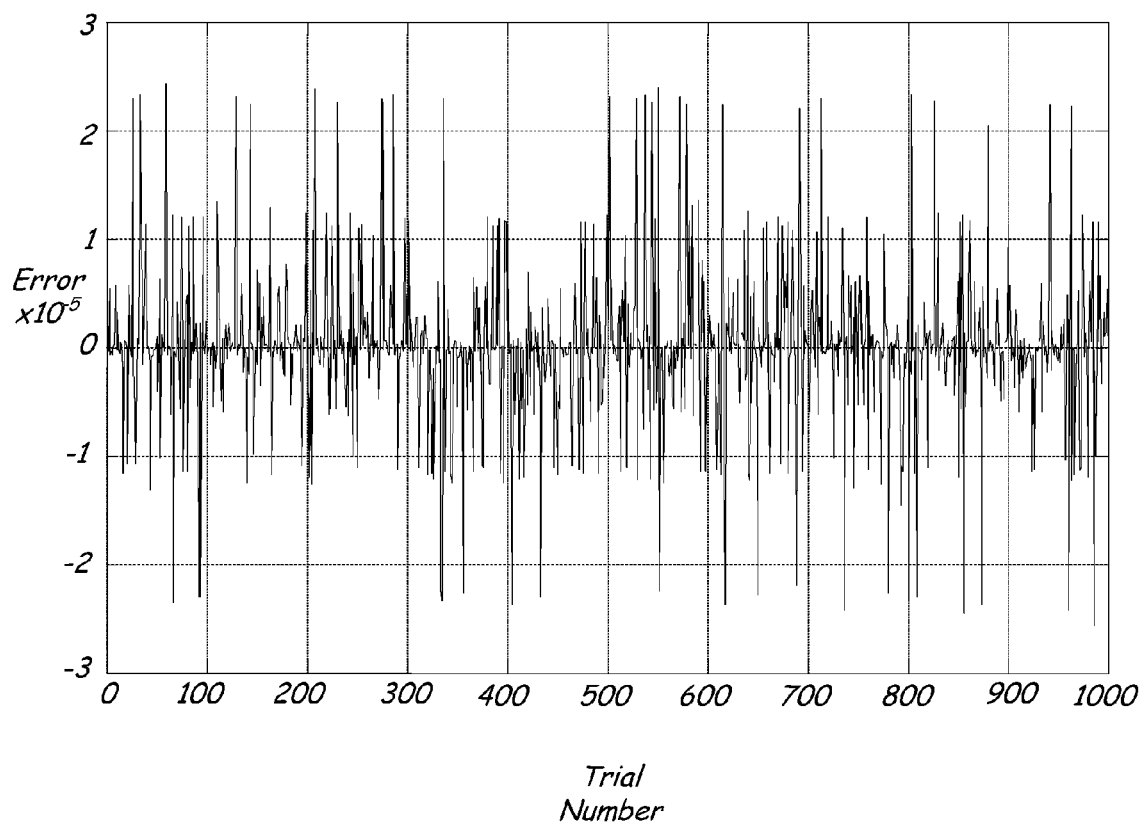
FIG. 9 is a graph of a particular illustrative embodiment of floating-point Fast Fourier Transform single-precision errors versus trial number for a dot-product implementation using discrete floating-point multipliers and adders.

FIG. 9 is a graph 900 of a particular illustrative embodiment of floating-point Fast Fourier Transform single-precision errors versus trial number for a dot-product implementation using discrete floating-point multipliers and adders. In this particular example, the graph 900 shows discrete floating-point operations using discrete floating-point adders and multipliers having error values in a range from $-2.4 \times 10^{-5}$ to $2.3 \times 10^{-5}$, which error range is about forty (40) percent higher than those produced by the fused dot-product unit 600.

Figure 10:
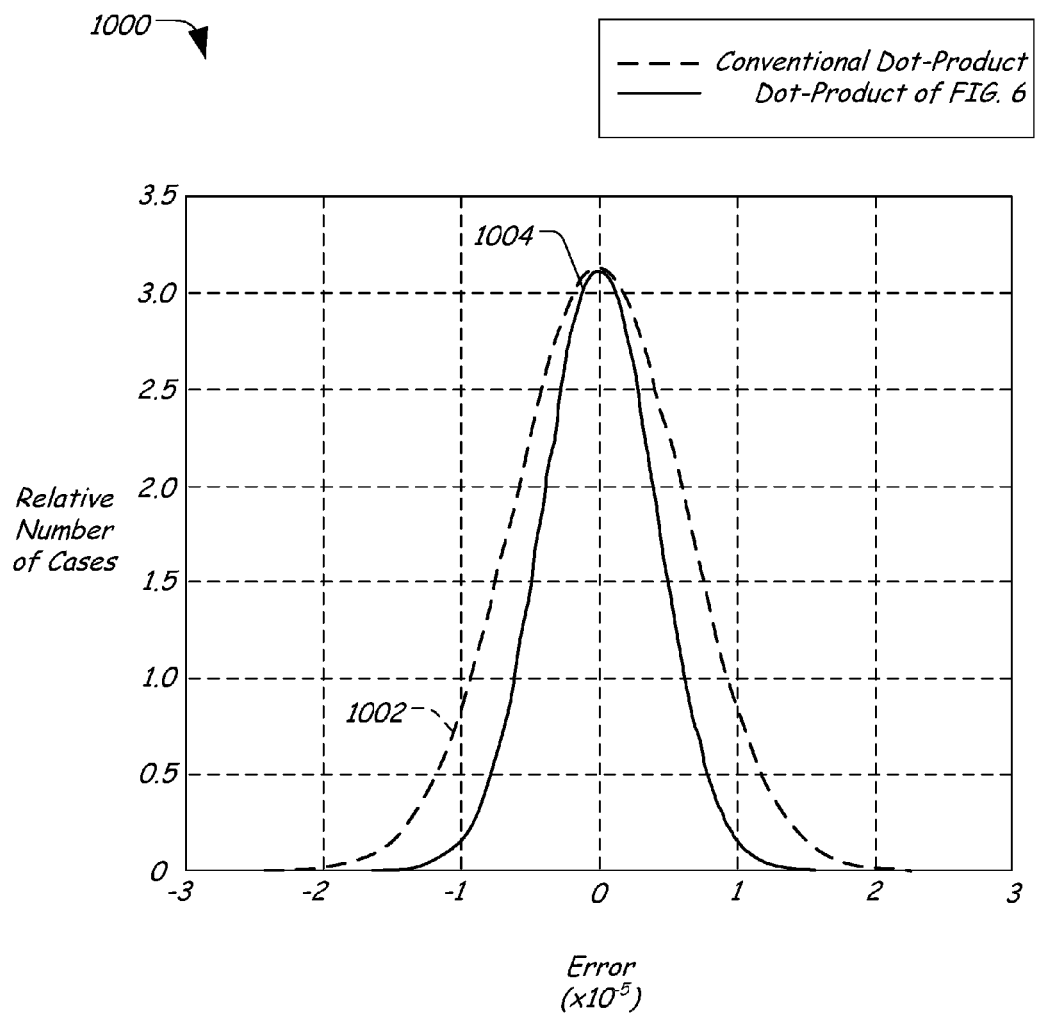
FIG. 10 is a graph of a particular illustrative embodiment of errors versus number of cases for conventional dot-product implementation as compared to a fused floating-point dot-product unit.

FIG. 10 is a graph 1000 of a particular illustrative embodiment of errors versus number of cases for conventional dot-product implementation as compared to a fused floating-point dot-product unit. The graph 1000 includes a first graph line 1002 that illustrates errors versus the number of cases for a conventional dot-product implementation. Further, graph 1000 illustrates a second graph line 1004 that illustrates errors versus the number of cases for a fused floating-point dot-product unit, such as the fused floating-point dot-product unit illustrated in FIG. 6. As shown, the second graph line 1004 represents a reduced error margin as compared to that of the conventional dot-product implementation, represented by the first graph line 1002.

To confirm the benefits of the fused dot-product unit 600, the following floating-point units were implemented in synthesizable Verilog-RTL:

1) a Conventional Floating-Point Adder;

2) a Conventional Floating-Point Multiplier; and 3) a Fused Floating-Point Dot-Product Unit (such as the fused dot-product unit 600 illustrated in FIG. 6).

In this particular example, the Verilog models were synthesized using 45 nm CMOS circuit libraries. The area and the critical timing paths were evaluated. All the units were designed to operate on single-precision IEEE Std-754 operands. Further, the placed and routed (tapeout ready) floating-point multiplier and fused dot-product units were timing-analyzed using industry standard STA tools, with an extracted and back-annotated netlist.

Table 1 represents the implementation data.

TABLE 1

Implementation Data.

| | F-P Multiplier | Fused Dot-product |
|---|---|---|
| Format | IEEE 754 Single-Precision | |
| Standard Cell area | 9,482 µm² | 16,104 µm² |
| Height | 102 µm | 140 µm |
| Width | 103 µm | 141 µm |
| Critical Timing Path | 1,804 ps | 2,721 ps |
| Dynamic Power | 5,068 µW | 5,839 µW |
| Leakage Power | 808 µW | 1,366 µW |
| Total Power | 5,876 µW | 7,205 µW |

In this particular example, the conventional floating-point multiplier occupies an area of 9,482 µm², while the fused dot-product unit occupies an area of 16,104 µm². The floating-point multiplier performed a multiply operation in 1804 ps, while the fused dot-product unit needed 2721 ps to perform the dot-product operation. The area of the fused dot-product unit includes two floating-point multipliers and a floating-point adder, but occupies less than twice the area of a single floating-point multiplier.

The area and latency of the two conventional approaches (ignoring the multiplexers and register) and the fused dot-product unit are compared in Table 2. The fused dot-product unit (such as the fused dot-product unit 600 illustrated in FIG. 6) is intermediate in area between a conventional serial dot-product implementation and the conventional parallel dot-product implementation. The fused dot-product unit has a latency that is about 80% of that of the conventional parallel dot-product implementation and about half that of the conventional serial dot-product implementation.

TABLE 2

Comparison of Dot-Product Approaches.

| | Unit | |
|---|---|---|
| | Area (µm²) | Latency (ps) |
| F-P Adder | 3,811 | 1,644 |
| F-P Multiplier | 9,482 | 1,804 |
| Dot-Product | | |
| Conv. Parallel | 22,775 | 3,448 |
| Conv. Serial | 13,293 | 5,252 |
| Fused | 16,104 | 2,721 |

From Table 2, it is apparent that the fused dot-product implementation is faster than either the parallel or serial dot-product implementations and occupies a circuit area that is between the parallel and serial implementations. Accordingly, higher throughput is achieved with an acceptable circuit area usage relative to conventional serial and parallel implementations.

Figure 11:
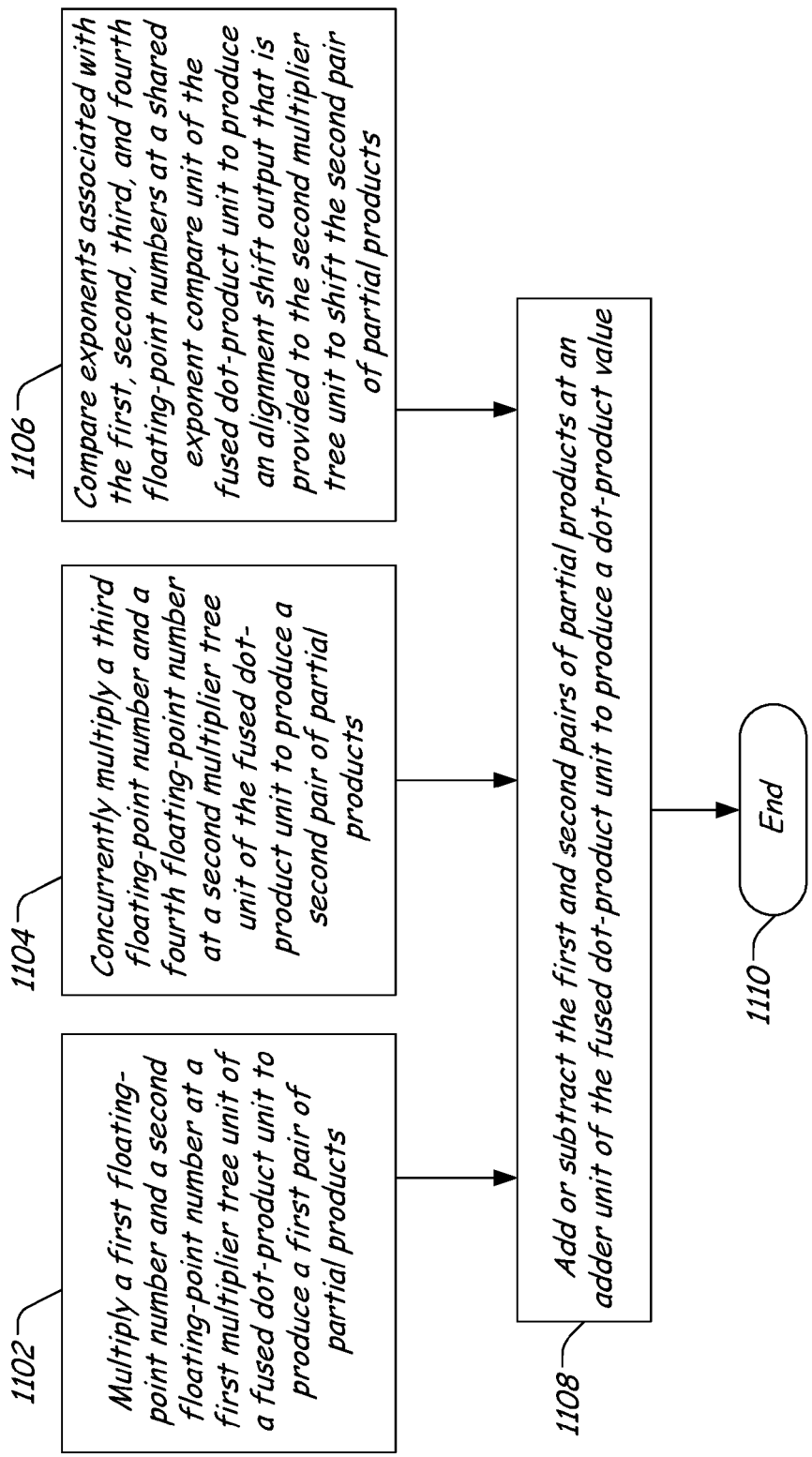
FIG. 11 is a flow diagram of a particular illustrative embodiment of a method of performing a dot-product operation using a fused floating-point dot-product unit.

FIG. 11 is a flow diagram of a particular illustrative embodiment of a method of performing a dot-product operation using a fused floating-point dot-product unit. At 1102, a first floating-point number and a second floating-point number are multiplied at a first multiplier tree unit of a fused dot-product unit to produce a first pair of partial products. Advancing to 1104, a third floating-point number and a fourth floating-point number are concurrently multiplied at a second multiplier tree unit of the fused dot-product unit to produce a second pair of partial products. Proceeding to 1106, exponents associated with the first, second, third, and fourth floating-point numbers are compared at a shared exponent compare unit of the fused dot-product unit to produce an alignment shift output that is provided to the second multiplier tree unit to shift at least one of the second pair of partial products. As shown, the exponents are compared (block 1106) concurrently (or in parallel) with the multiplying of the first, second, third, and fourth floating-point numbers (blocks 1102 and 1104). Continuing to 1108, the first and second products are added or subtracted at an adder unit of the fused dot-product unit to produce a dot-product value. In a particular embodiment, the fused dot-product unit reduces propagation and rounding errors in Fast Fourier Transform (FFT) calculations. The method terminates at 1110.

In a particular embodiment, adding the first and second pairs of partial products includes adding the first and second pairs of partial products at a four-to-two carry save adder to produce a first product and a second product and adding the first and second products to product the dot-product value. In another particular embodiment, the method further includes normalizing the dot-product value via a normalize unit of the fused dot-product unit. Further, the method can include rounding the normalized dot-product value via a round and post-normalize unit of the fused dot-product unit to generate a dot-product output related to the dot-product value.

In another particular embodiment, the method includes setting the second and fourth floating-point numbers to a value of one, selectively activating first and second multiplexers to bypass the first and second multiplier tree units to provide the first and third floating-point numbers to the adder unit, and adding the first and third floating-point numbers via the adder unit to produce a sum.

In conjunction with the floating-point fused dot-product unit and the methods described above, digital signal processing operations, such as discrete cosine transforms (DCTs), Fast Fourier Transform (FFT) butterfly operations, and other complex mathematical operations can be performed with reduced rounding errors and faster throughput. Further, by sharing the exponent compare circuit, by including two multipliers, and by including a four-to-two (4:2) carry save adder, the floating-point fused dot-product unit can perform a dot-product operation on four operands in only fifty (50) percent more time than a conventional floating-point multiplication operation.

Although the present invention has been described with reference to preferred embodiments, workers skilled in the art will recognize that changes may be made in form and detail without departing from the spirit and scope of the invention.

What is claimed is:

1. A dot-product unit to perform single-precision floating-point dot-product and addition operations, the dot-product unit comprising:

a first multiplier tree unit adapted to multiply first and second significand operands to produce a first set of two partial products;

a second multiplier tree unit adapted to multiply third and fourth significand operands to produce a second set of two partial products;

a shared exponent compare unit adapted to compare exponents of the first, second, third and fourth operands to produce an alignment shift value;

an alignment unit adapted to shift the second set of two partial products based on the alignment shift value; and an adder unit adapted to add or subtract the first set of two partial products and the second shifted set of two partial products to produce a dot-product value that is a single-precision floating-point value.

2. The dot-product unit of claim 1, wherein the adder unit comprises:

a four-to-two carry save adder unit adapted to add the first and second sets of two partial products to produce two terms; and an adder unit adapted to sum the two terms to produce a sum of the first and second products.

3. The dot-product unit of claim 2, further comprising a complement unit adapted to selectively generate a complement of the sum based on the first and second of at least two partial products.

4. The dot-product unit of claim 2, further comprising a complement unit coupled to the alignment unit and adapted to complement the second set of two partial products, wherein the adder unit subtracts the second set of two partial products from the first set of two partial products to produce a difference value.

5. The dot-product unit of claim 4, further comprising:
 a normalize unit coupled to the adder unit and adapted to receive the normalization value from the leading zero anticipator, the normalize unit to normalize the sum based on the normalization value; and
 a round and post-normalize unit to round the normalized sum to produce the dot-product value.

6. A floating-point fused dot-product unit comprising:
 a first multiplier tree unit having a first pair of inputs to receive a first pair of floating-point significand numbers and to produce a first pair of partial products;
 a second multiplier tree unit having a second pair of inputs to receive a second pair of floating-point significand numbers and to produce a second pair of partial products;
 a shared exponent compare unit coupled to the first and second pairs of inputs and adapted to compare first, second, third, and fourth exponents of the first and second pairs of floating-point significand numbers to provide an alignment shift output based on the comparisons;
 an alignment unit responsive to the alignment shift output to shift the second pair of partial products; and
 an adder unit adapted to add or subtract the first and second pairs of partial products to produce a dot-product value.

7. The floating-point fused dot-product unit of claim 6, wherein the first and second pairs of floating-point numbers are processed concurrently by the first and second multiplier tree units and by the shared exponent compare unit.

8. The floating-point fused dot-product unit of claim 6, wherein the floating-point fused dot-product unit performs a dot-product operation in approximately forty-nine (49) percent of the time required by a serial dot-product unit.

9. The floating-point fused dot-product unit of claim 6, wherein a circuit area occupied by the floating-point fused dot-product unit is less than or equal to approximately seventy (70) percent of an area to implement a parallel dot-product unit.

10. The floating-point fused dot-product unit of claim 6, wherein the adder unit further comprises a carry save adder including:
 a first pair of inputs coupled to the alignment unit to receive the second pair of products; and
 a second pair of inputs coupled to the first multiplier tree unit to receive the first pair of products;
 wherein the carry save adder adapted to output two terms related to the first and second pairs of products.

11. The floating-point fused dot-product unit of claim 10, wherein the carry save adder comprises a four to two reduction tree, and wherein the two terms are provided to an adder circuit to sum the two terms to produce the dot-product value.

12. The floating-point fused dot-product unit of claim 6, further comprising a complement unit coupled to the alignment unit and adapted to complement the second pair of partial products, wherein the adder unit subtracts the second pair of partial products from the first pair of partial products to produce a difference value.

13. The floating-point fused dot-product unit of claim 6, further comprising:
 a normalize unit adapted to normalize a sum from the adder unit; and
 a rounding unit adapted to round the normalized sum to produce the dot-product value.

14. A method of producing a single-precision floating-point dot-product, the method comprising:
 multiplying a significand of a first floating-point number and a significand of a second floating-point number at a first multiplier tree unit of a fused dot-product unit to produce a first pair of partial products;
 concurrently multiplying a significand of a third floating-point number and a significand of a fourth floating-point number at a second multiplier tree unit of the fused dot-product unit to produce a second pair of partial products;
 comparing exponents associated with the first, second, third, and fourth floating-point numbers at a shared exponent compare unit of the fused dot-product unit to produce an alignment shift output that is provided to the second multiplier tree unit to shift the second pair of partial products; and
 adding or subtracting the first and second pairs of partial products at an adder unit of the fused dot-product unit to produce a dot-product value.

15. The method of claim 14, wherein adding the first and second pairs of partial products comprises:
 adding the first and second pairs of partial products at a four-to-two carry save adder to produce a first term and a second term; and
 adding the first and second terms to produce the dot-product value.

16. The method of claim 14, further comprising normalizing the dot-product value via a normalize unit of the fused dot-product unit.

17. The method of claim 16, further comprising rounding the normalized dot-product value via a round and post-normalize unit of the fused dot-product unit to generate a dot-product output related to the dot-product value.

18. The method of claim 14, further comprising predicting one or more leading zeros based on the first and second products via a leading zeros anticipator unit of the fused dot-product unit, the leading zeros anticipator unit adapted to provide a prediction value to the normalize unit of the fused dot-product unit to normalize the dot-product value.

19. The method of claim 14, further comprising:
 setting the second and fourth floating-point numbers to a value of one;
 selectively activating first and second multiplexers to bypass the first and second multiplier tree units to provide the first and third floating-point numbers to the adder unit; and
 adding the first and third floating-point numbers via the adder unit to produce a sum.

20. The method of claim 14, wherein the fused dot-product unit reduces propagation and rounding errors in Fast Fourier Transform (FFT) calculations relative to a dot-product operation using discrete multiplier and adder modules.

* * * * *